Figure 1:
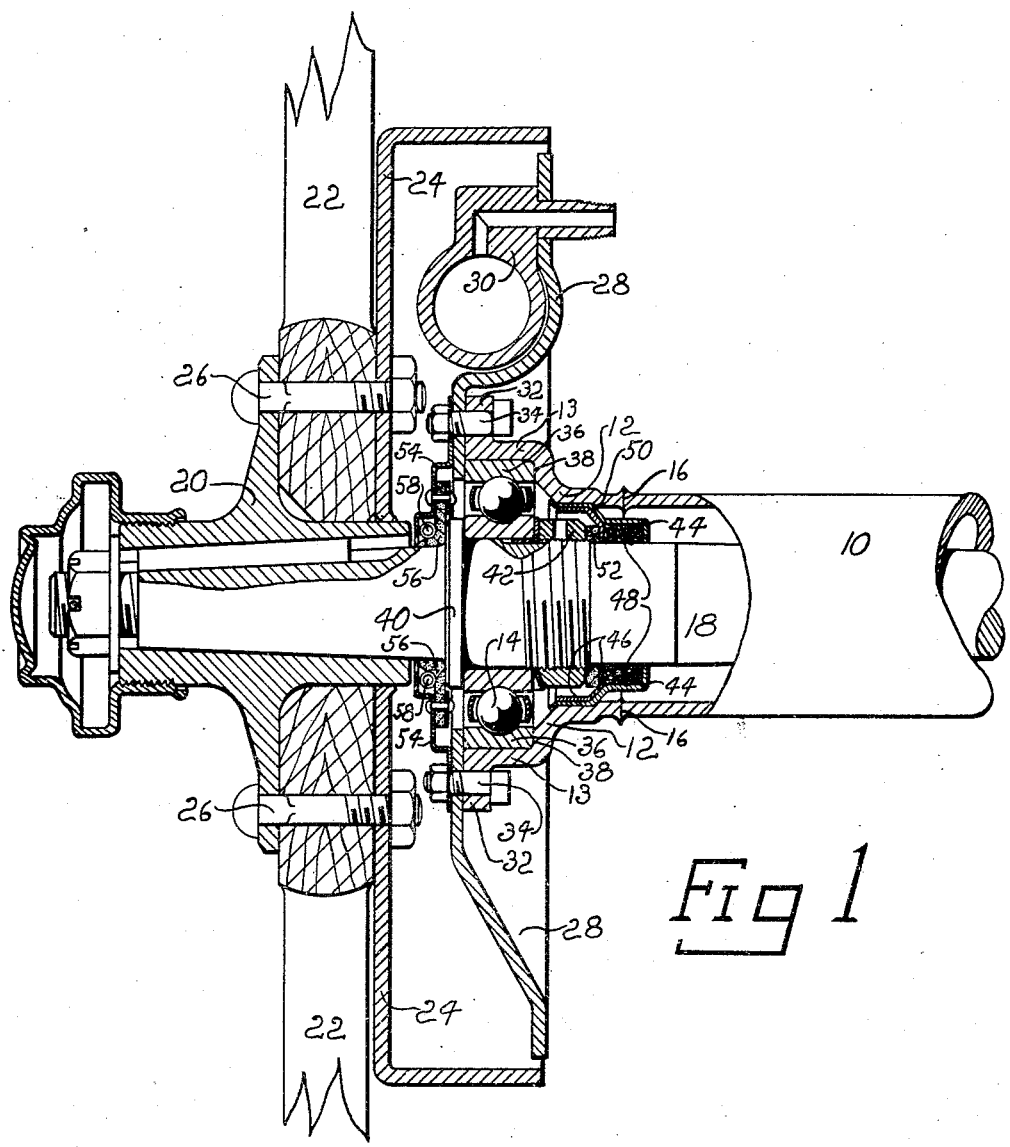

Dec. 9, 1930.   O. R. SKELTON   1,784,394
AXLE CONSTRUCTION
Filed Dec. 19, 1927

INVENTOR
OWEN R. SKELTON.
BY
ATTORNEY

Patented Dec. 9, 1930

1,784,394

UNITED STATES PATENT OFFICE

OWEN R. SKELTON, OF DETROIT, MICHIGAN, ASSIGNOR TO CHRYSLER CORPORATION, OF DETROIT, MICHIGAN, A CORPORATION OF DELAWARE

AXLE CONSTRUCTION

Application filed December 19, 1927. Serial No. 240,965.

This invention relates to an axle construction and more particularly to a construction in which a detachable flange on a shaft housing is adapted to form a retainer for the bearing between the shaft and the housing.

An important object of the invention is to simplify the present construction for retaining the bearing within the housing and support. Heretofore additional means has been provided for securing the outer bearing of an automobile axle in position and other parts such as the axle and lubricant retainers have required means for holding them within the axle housing.

It is another object of this invention to provide a single means for retaining the parts within the axle housing.

Other objects and advantages will more fully appear from the following description taken in connection with the accompanying drawing in which the figure is a sectional view thru an automobile rear axle and wheel.

Referring to an illustrated embodiment of my invention, an axle housing 10 has been provided with an end portion 12 which is expanded radially as at 13 to receive a combined thrust and radial bearing 14 and which is shown welded to the axle housing as at 16. An axle 18 is journaled in the bearing 14 at its outer end and is adapted to be driven by a suitable differential mechanism, not shown.

The end of the shaft 18 beyond the bearing 14 is tapered to receive a hub 20 of an automobile wheel 22. A brake drum 24 is secured to the inner side of the wheel by bolts 26 which also secure the hub to the wheel. A plate 28 secured to the axle housing is adapted to form a support for the brake mechanism, illustrated as at 30, of the hydraulic type.

The end portion 12 is provided with a radial flange 32 adapted to receive bolts 34 for securing the brake mechanism supporting plate thereto. The inner periphery of the plate 28 projects beyond the inner periphery of the radially expanded portion 13 and is adapted to engage the outer edge of the bearing outer race 36 securing it in position against a shoulder 38 formed by radially expanding the end portion 12. The inner race of the bearing 14 is secured on the axle 18 by holding it between a radial flange 40 on the axle and a screw threaded member 42 engaging the axle.

A lubricant retainer, between the housing 10 and axle 18, comprises an outer member 44 and an inner member 46 having a suitable packing 48 therebetween. The packing is formed as a unit and received in the end portion 12 abutting against a shoulder 50. Packing 52 is provided between the screw-threaded member 42 and inner member 46 to retain the first mentioned packing against outer axial movement.

Another lubricant seal is provided between the housing 10 and axle 18 at the outer side of flange 40. This seal comprises a member 54 carried by the bolts 34, which secure the plate 28 to the end portion 12, and has packing material 56 secured thereto. The packing 56 is resiliently held in engagement with the outer end of the shaft 18 and flange 40 by a coil spring 58.

It will be understood that a construction has been provided in which the brake supporting plate, secured to the axle housing, secures the axle and its associated parts within the axle housing. The whole assembly is held against outer axial movement by the integral extended portion of the plate 28.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In an axle construction of the class described, an axle housing, an integral radially extended bell shaped portion at the outer end of said housing, a bearing in said extended portion, a radial flange at the outer edge of said bell shaped portion, and a brake mechanism supporting plate adapted to be secured to the outer surface of said flange and extending radially beyond the inner periphery of said bell shaped portion to hold said bearing.

2. In an axle construction of the class described, an axle housing having an enlarged end portion comprising a radial shoulder adapted to engage the outer race of a bearing against inward axial movement, and a brake mechanism supporting plate secured to the outer edge of said housing adapted to retain said outer race against outward axial movement.

3. In an axle construction of the class described, an axle housing, shoulders in the outer end of said housing adapted to retain the outer race of a bearing and a lubricant sealing member against inner axial movement, an axle journaled in said housing, means for securing the inner race of said bearing to said axle, means associated with said axle and said lubricant sealing member for urging the latter inwardly against the shoulder holding it axially, and a brake mechanism supporting member secured to said housing adapted to hold said bearing, axle and lubricant sealing member against outer axial movement.

4. In an axle construction of the class described, an axle housing, a bearing in the outer end of said housing, an axle journaled in said bearing, lubricant sealing means at the opposite sides of said bearing, a brake mechanism supporting member at the outer edge of said housing adapted to hold all of said elements against outer axial movement within said housing, and means for securing said brake mechanism supporting member and one of said sealing members to said housing.

5. In an axle construction of the class described, an axle housing comprising a substantially cylindrical end portion, a bearing casing secured to said end portion having a radial shoulder, a bearing in the casing engaged against said shoulder, an axle journaled in said bearing, and a brake mechanism supporting plate secured to said housing adapted to retain said axle and bearing within said housing, said plate holding said axle thru its pressure on said bearing.

6. In an axle construction of the class described, an axle housing having an enlarged extremity, a bearing in said enlarged extremity, an axle journaled in said housing and bearing, a wheel on said axle, a brake drum on said wheel, a brake mechanism supporting plate secured to the end of said axle housing, said plate projecting radially from said housing substantially closing the inner open end of the brake drum and projecting beyond the inner periphery of the axle housing adjacent the outer side of said bearing.

OWEN R. SKELTON.